(12) United States Patent
Takaike

(10) Patent No.: US 6,542,327 B2
(45) Date of Patent: Apr. 1, 2003

(54) DISK DRIVE UNIT

(75) Inventor: Eiji Takaike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 09/725,822

(22) Filed: Nov. 29, 2000

(65) Prior Publication Data

US 2001/0030830 A1 Oct. 18, 2001

(30) Foreign Application Priority Data

Mar. 17, 2000 (JP) ........................................ 2000-076831

(51) Int. Cl.⁷ .............................................. G11B 33/14
(52) U.S. Cl. .................................................. 360/97.02
(58) Field of Search ...................... 369/75.1; 360/97.01, 360/97.02

(56) References Cited

U.S. PATENT DOCUMENTS

| | | | | |
|---|---|---|---|---|
| 5,255,254 A | * | 10/1993 | Watanabe et al. | 360/97.02 |
| 5,526,203 A | * | 6/1996 | Mohajerani et al. | 360/97.02 |
| 5,636,082 A | * | 6/1997 | Shibuya et al. | 360/97.02 |
| 5,696,649 A | * | 12/1997 | Boutaghou | 360/97.02 |
| 6,147,834 A | * | 11/2000 | Srikrishna et al. | 360/97.02 |
| 6,271,987 B1 | * | 8/2001 | Allsup et al. | 360/97.02 |

FOREIGN PATENT DOCUMENTS

| | | |
|---|---|---|
| JP | 52134714 A | 11/1977 |
| JP | 11-073756 | 3/1999 |
| JP | 11-232866 | 8/1999 |

* cited by examiner

*Primary Examiner*—William Klimowicz
*Assistant Examiner*—Julie Anne Watko
(74) *Attorney, Agent, or Firm*—Greer, Burns & Crain, LTD

(57) ABSTRACT

The disk drive unit is capable of fully preventing vibration of magnetic heads, which are caused by turbulent air streams. The disk drive unit includes: an enclosure; a shaft being provided in the enclosure and capable of rotatably holding a disk; and a screen member being provided on an inner face of the enclosure, enclosing the shaft and being extended in parallel to the shaft. In the disk drive unit, a space is formed between the screen member and an inner bottom face of the enclosure.

6 Claims, 6 Drawing Sheets

DISK DRIVE UNIT

BACKGROUND OF THE INVENTION

The present invention relates to a disk drive unit, more precisely relates to a disk drive unit, which is capable of preventing vibration of magnetic heads and magnetic disks, which are caused by air steam.

FIG. 16 shows a plan view of an inner mechanism of a conventional disk drive unit. Magnetic disks 102 are accommodated in an enclosure 100. Arms 104 are swung parallel to surfaces of the disks 102 by actuators 106. Suspensions 108 are respectively fixed to front ends of the arms 104. A magnetic head 110 is attached to a front end of each suspension 108. The magnetic heads 114 respectively face the surfaces of the disk 102.

FIG. 17 is a side sectional view of the disk drive unit, in which the magnetic disks 102 are seen from the side. The disks 102 are arranged in an axial direction of a shaft 112. The magnetic heads 102 respectively correspond to the disks 102. The shaft 112 is connected to a spindle motor (not shown), so that the disks 102 are rotated together with the shaft 112 by the spindle motor.

While the disks 102 are stopped, the magnetic heads 110 respectively contact the surfaces of the disks 102; while the disks 102 are rotated, the magnetic heads 110 are lifted or floated from the surface of the disks 102 by air streams, which are caused by the rotation of the disks 102. For writing and reading data, seeking action of the magnetic heads 110 are executed by swinging the arms 106 about a shaft 105 by the actuators 106.

The disks 102 are rotated at high speed so as to write and read data, so dusts in the enclosure 100 badly influence the seeking action. Therefore, the enclosure 100 includes a filter so as to prevent invasion of dusts. Since the enclosure 100 is tightly sealed and the arms 104, the magnetic heads 110, etc. are moved at high speed, the air streams, which are caused by the rotation of the disks 102, are disturbed in the enclosure 100. Namely, stable air streams cannot be gained.

The magnetic heads 110 are vibrated by disturbed air streams or turbulent air streams, so that, in some cases, the magnetic heads 110 are excessively floated from the surface of the disks 102. With this action, the conventional disk drive unit has following disadvantages: the magnetic heads 110 cannot write and read data; the surfaces of the disks 102 are damaged by colliding the magnetic heads 110 therewith; the suspensions 108 are bent; and the magnetic heads 110 are damaged.

These days the seeking action must be faster and faster due to higher record density and greater memory capacity. Further, floating level of the magnetic heads 110, which are height of the magnetic heads 110 from the surface of the disks 102, must be precisely controlled, so that the vibration of the magnetic heads 110, which are caused by the turbulent air streams in the enclosure 100, must be prevented.

To protect the magnetic heads 110 from the turbulent air streams, another conventional disk drive unit has a screen member 120, which encloses the disks 102 (see FIG. 18). In this disk drive unit, a space between a side face of the screen member 120 and outer circumferential faces of the disks 102 is made narrow so as to limit air streams between the disks 102. With this structure, the vibration of the magnetic heads 110 can be reduced. However, the screen member 120 shown in FIG. 18 cannot fully prevent the vibration of the magnetic heads 110.

SUMMARY OF THE INVENTION

An object of the present invention is to provide a reliable disk drive unit capable of fully preventing vibration of magnetic heads, which are caused by turbulent air streams, which is caused by rotation of disks.

Another object of the present invention is to provide a disk drive unit capable of having higher record density and operating at higher speed.

To achieve the object, a first basic structure of the disk drive unit of the present invention comprises: an enclosure; a shaft being provided in the enclosure, the shaft rotatably holding a disk; and a screen member being provided on an inner face of the enclosure, the screen member enclosing the shaft and being extended in parallel to the shaft, wherein a space is formed between the screen member and an inner bottom face of the enclosure.

In the disk drive unit, another space may be formed between the screen member and the inner face of the enclosure. With this structure, the air streams caused by the rotation of the disk can be introduce into another space, so that the air streams, which upwardly flow in the enclosure, can be properly restricted. Further, the screen member may be continuously rounded along the inner face of the enclosure. With this structure, the air streams can be circulated in another space and the air streams, which upwardly flow, can be properly restricted.

A second basic structure of the disk drive unit of the present invention comprises: an enclosure; a shaft being provided in the enclosure; and a plurality of disks being provided in the enclosure and rotatably held, with regular separations, by the shaft, wherein diameter of one of the disks is greater than that of others.

The disk drive unit may further comprise a screen member being provided close to outer circumferential faces of the disks other than the disk having greater diameter and extended in parallel to the shaft.

Further, in the disk drive unit, a space may be formed between the screen member and an inner face of the enclosure.

In the disk drive unit of the present invention, the air streams, which upwardly flow from the inner bottom face when the disk is rotated, can be properly restricted. By restricting the air streams, the vibration of the magnetic disk and the magnetic head, which occur while rotating the magnetic disk, can be effectively restricted. Therefore, data can be precisely written and read with high speed rotation of the disk. Further, colliding the magnetic head with the surface of the disk can be prevented, so that crush of the magnetic disk can be prevented and reliability of the disk drive unit can be improved.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
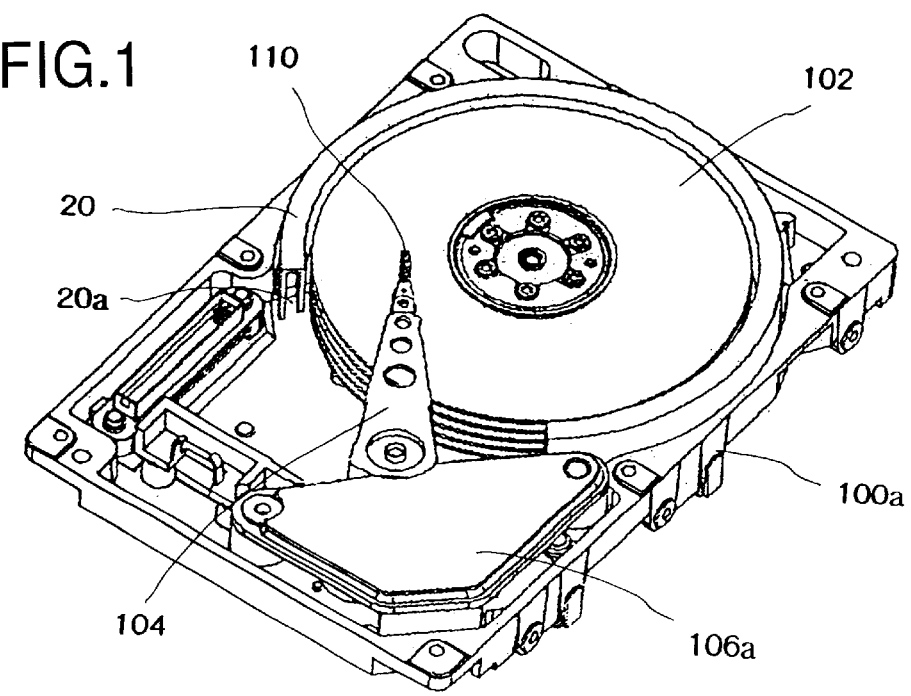
FIG. 1 is a perspective view of a main part of the disk drive unit of an embodiment of the present invention.
Figure 2:
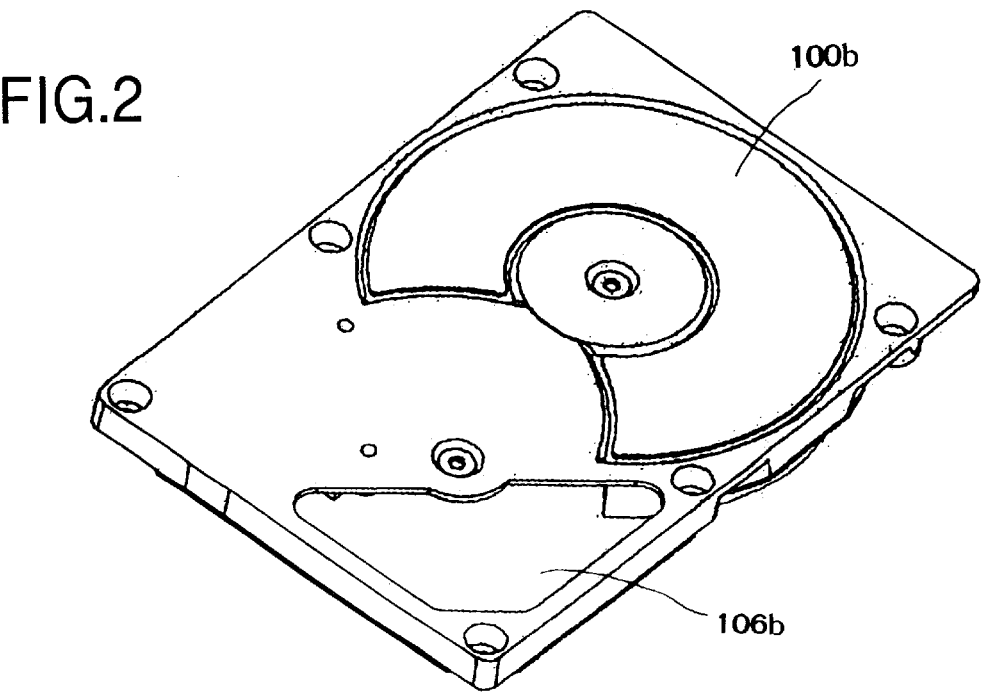
FIG. 2 is a perspective view of a cover of the disk drive unit.

FIG. 1 is a perspective view of a main part of the disk drive unit of the present embodiment; FIG. 2 is a perspective view of a cover thereof. A base 100a and a cover 100b constitute an enclosure. The base 100a is formed like a box and capable of accommodating inner elements, e.g., magnetic disks 102. A concave section 106b is formed in the cover 100b, and an actuator case can be fitted in the concave section 106b when the cover 100b is attached to the base 100a. By attaching the cover 100b to the base 100a, the magnetic disks 102, etc. can be tightly accommodated in the enclosure.

The characteristic point of the disk drive unit is the structure of a screen member 20. The screen member 20 is located close to outer circumferential faces of the magnetic disks 102. Therefore, a very narrow space is formed between the outer circumferential faces of the magnetic disks 102 and the screen member 20 and formed in the circumferential direction of the magnetic disks 102. As shown in FIG. 1, a sectional shape of the screen member 20 is formed into a U-shape so as to form a space 20a.

The screen member 20 encloses the outer circumferential faces of the magnetic disks 102. While the seeking action, arms 104 are swung between inner edges of the magnetic disks 102 and outer edges thereof, so a specific part, in which the arms 104 are moved, is not enclosed by the screen member 20. Thus, the outer circumferential faces of the magnetic disks 102 are partially exposed.

The screen member 20 is provided so as to restrict the vibration of magnetic heads 110, which are caused by turbulent air streams, which are occurred by rotating the magnetic disks 102 at high speed. Since the clearance between the screen member 20 and the outer circumferential faces of the magnetic disks 102 is very narrow, the air streams are prevented to flow upward and downward. By forming the space 20a, the air streams can be introduced in the circumferential direction of the magnetic disks 102 and disturbance of the air streams can be restricted.

Figure 3:
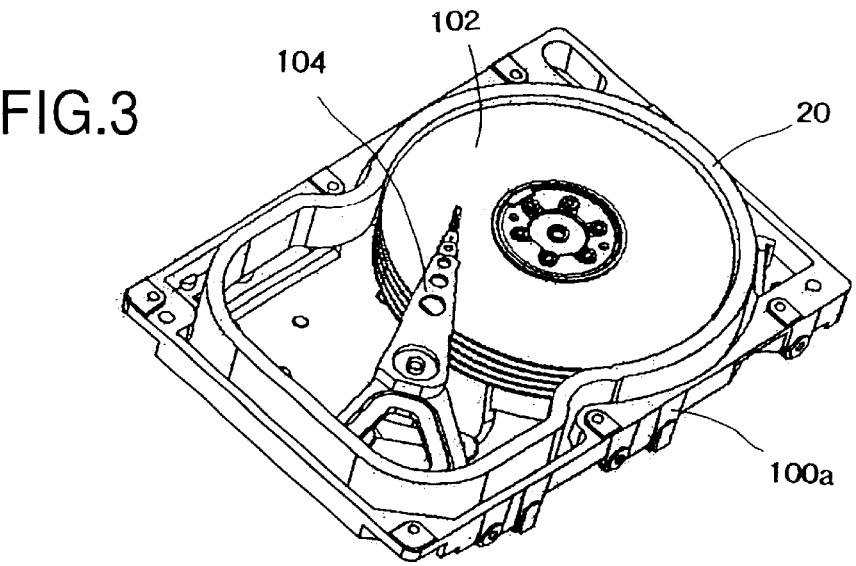
FIG. 3 is a perspective view of the disk drive unit in which a screen member is continuously rounded.

In the disk drive unit shown in FIG. 3, the screen member 20 is continuously rounded in the enclosure. With this structure, the air streams can be effectively introduced in the circumferential direction of the magnetic disks 102. Since the space 20a is also continuously rounded, the air streams caused by the rotation of the magnetic disks 102 can be circulated in the space 20a. Therefore, even if the circumferential faces of the magnetic disks 102 are partially exposed, the disturbance of the air streams can be restricted.

Another embodiment, which has a different screen member, will be explained with reference to FIGS. 4 and 5. The base 100a is formed like a plate; the cover 100b is formed like a box so as to accommodate the inner elements, e.g., the magnetic disks 102. Structures of the magnetic disks 102, the arms 104, etc. are almost equal to those of the foregoing embodiment. In the present embodiment, the screen member 22 is provided in the cover 100b, so the screen member 22 can be enclose the magnetic disks 102 when the cover 100b is attached to the base 100a. The screen member 22 is formed into an arc-shape, an inner face of the screen member 22 is located close to the outer circumferential faces of the magnetic disks 102. A space 22a, in which the air streams are introduced, is formed between the screen member 22 and an inner face of the cover 100b.

Figure 4:
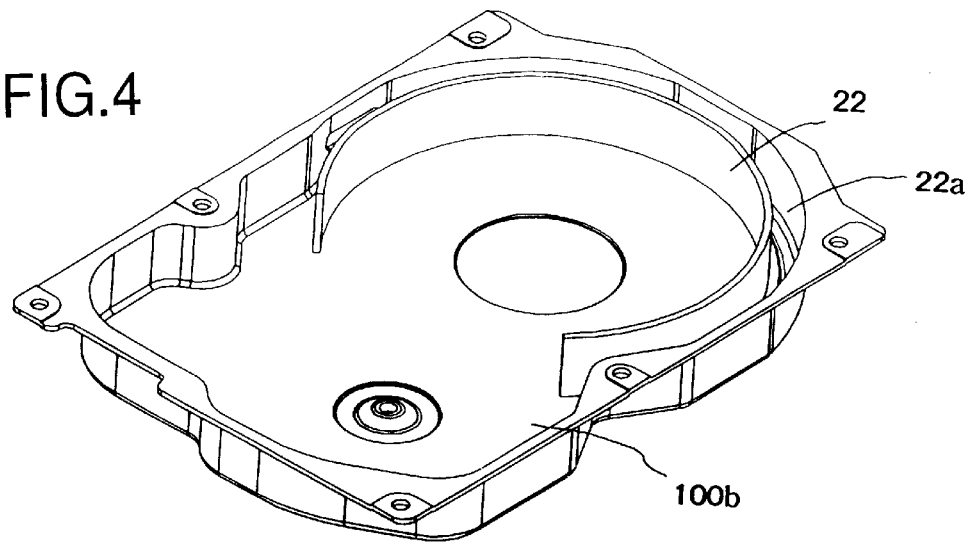
FIG. 4 is a perspective view of the disk drive unit in which a screen member is formed in a cover.
Figure 5:
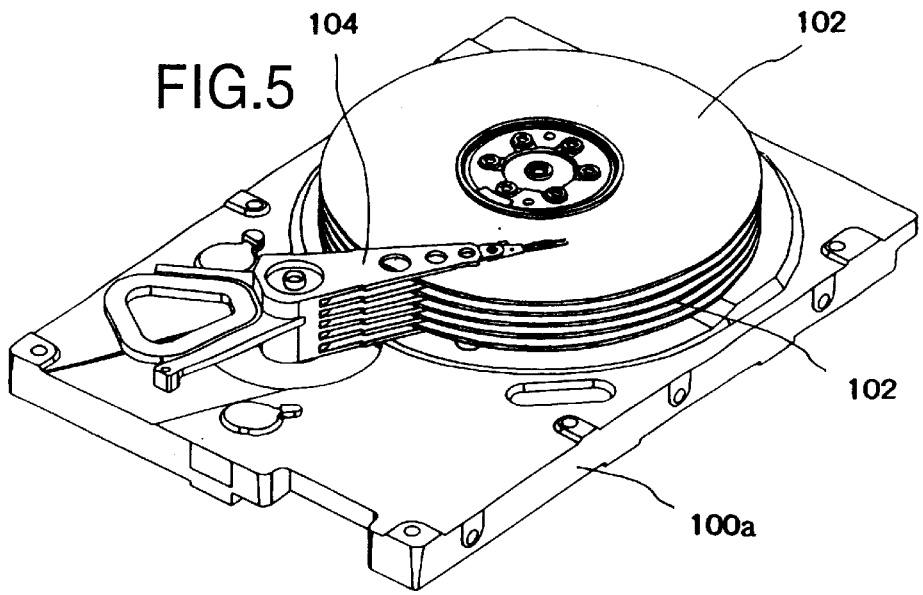
FIG. 5 is a perspective view of the main part of the disk drive unit.

As shown in FIG. 4, the specific part, in which the arms 104 are moved, is not enclosed by the screen member 22.

Figure 6:
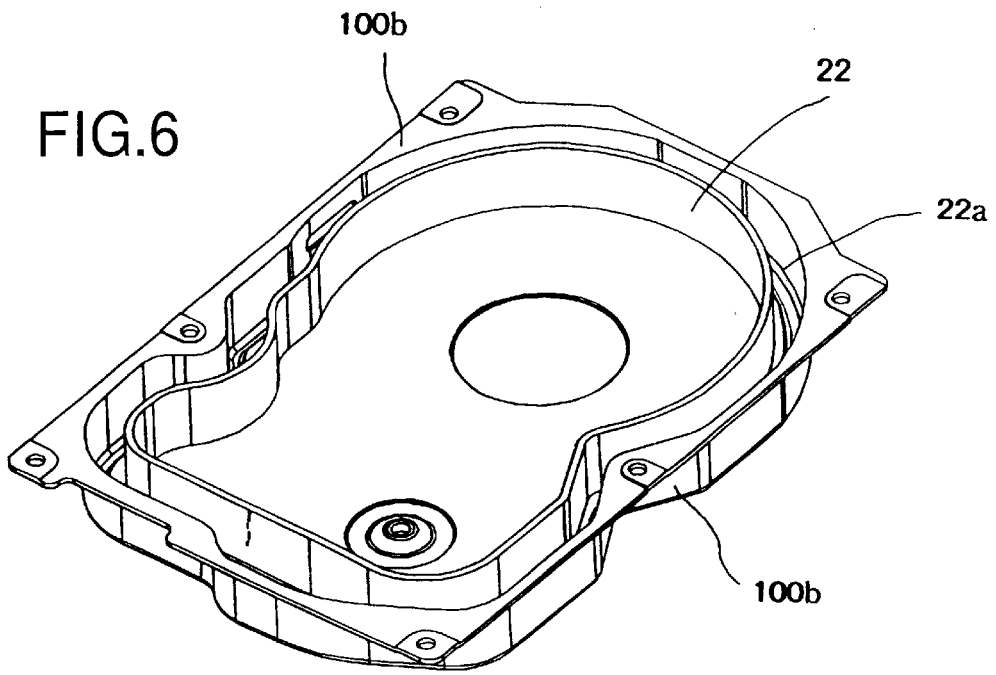
FIG. 6 is a perspective view of the disk drive unit in which the screen member is continuously rounded.

On the other hand, in an embodiment shown in FIG. 6, the screen member 22 is continuously rounded in the cover 100b. Since a space 22a is also continuously rounded, the air streams can be circulated in the space 22a. Therefore, the disturbance of the air streams can be restricted.

The screen members 20 and 22 are provided so as to restrict the vibration of the magnetic heads 110, which are caused by the turbulent air streams, which are occurred by rotating the magnetic disks 102 at high speed.

To find effective structures of the screen member, the inventor of the present invention executed experiments, in which influences of the air streams in the enclosures were observed. It is said that the air streams, which is caused by the rotation of the magnetic disks, are directed in the rotational direction of the magnetic disks. However, the disk drive unit (the enclosure) is tightly sealed, so the direction of the air streams in the enclosure is not limited to the rotational direction of the magnetic disks 102.

In the experiments, powders were accommodated in the tightly sealed enclosure, then the magnetic disks were rotated at high speed. The inventor observed states of sticking the powders in the enclosure.

Figure 7:
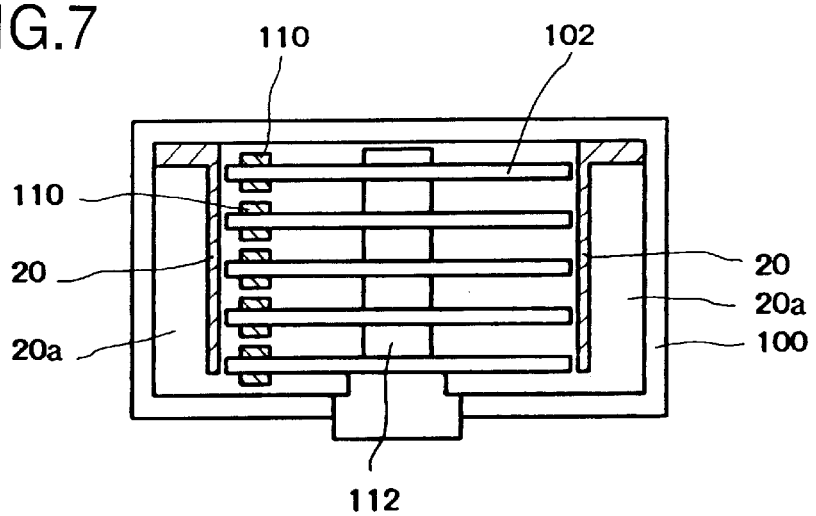
FIG. 7 is an explanation view of the disk drive unit in which a space is formed between the screen member and an inner face of an enclosure.

Firstly, the experiment was executed with the disk drive unit shown in FIG. 7. 1 g of baby powders were put in a desiccant case instead of a desiccant. The cover was tightly attached to the base. Then, the magnetic disks 102 were rotated for 60 minutes with the rotational speed of 10,000 rpm. The structure of the disk drive unit was equal to that shown in FIG. 1, and number of the magnetic disks was five.

After the experiment, the state of sticking the powders was observed. The most characteristic point was that amount of sticking the powder on the upper cover was much greater than that on the lower base.

The inner face of the cover, which faced the magnetic disks, was covered with much amount of powders; the inner face of the base, which faced the magnetic disks, was covered with almost no powders.

Further, the five magnetic disks, which were arranged between the cover and the base with regular separations, were observed. The four disks on the base side were covered with less powders. Amount of sticking the powders on the four was gradually increased toward the cover. On the other hand, much amount of the powders are stuck on both surfaces of the uppermost disk (the fifth disk). Especially, the upper surface of the fifth disk was wholly covered with the powders.

In another experiment, 1 g of the baby powders were put in a bottom of the base, in which the magnetic disks were set. The cover was tightly attached to the base. Then, the magnetic disks 102 were rotated for 10 second with the rotational speed of 10,000 rpm.

After the experiment, the state of sticking the powders was observed. The inner face of the cover was covered with much amount of powders; the inner face of the base was covered with almost no powders. Amount of sticking the powders on the disk was gradually increased toward the uppermost disk. Especially, in the uppermost disk, amount of the powders on the upper surface is greater than that on the lower surface. Further, in the upper surface of the uppermost disk, amount of sticking the powders in an inner part was greater than that in an outer part because angular velocity of the outer part was faster than that of the inner part.

The experiments said that air streams upwardly conveyed the powders in the enclosure. The air flows from one place, at which air pressure is high, to another place, at which air pressure is lower than that of the one place; the air flows from one place, at which air temperature is high, to another place, at which air temperature is lower than that of the one place. While the magnetic disks were rotated, air pressure in the cover is lower than that in the base, so that the air in the enclosure upwardly flows as shown by arrows in FIG. 17. Thus, if the air streams from the base to the cover is prevented, the turbulent air stream in the vicinity of each disk can be stable and excessive vibration of each magnetic head can be prevented.

The screen members 20 and 22 in the foregoing embodiments are designed with considering the air streams in the enclosures. Namely, the screen members 20 and 22 are capable of preventing or restricting the air streams, which upwardly flow from the base to the cover.

Function of the screen members for restricting the air streams will be explained with reference to FIGS. 7–13. In each case, the screen member is provided between the magnetic disks 102 and the enclosure 100. Note that, relative relationships among the magnetic disks 102, the enclosures 100 and the screen members 20, 24, 26, 28, 30 and 32 are shown in FIGS. 7–13.

In FIG. 7, the screen member 20 was explained in the forgoing embodiments. Namely, the clearance between the outer circumferential faces of the magnetic disks 102 and the screen member 20 is very narrow so as to restrict the air streams flowing upward. And, a narrow space is formed between a lower end (i.e., the terminal end) of the screen member 20 and an inner bottom face of the enclosure 100 so as to introduce air into the space 20a, which is formed in the screen member 20 (see FIG. 1).

Figure 8:
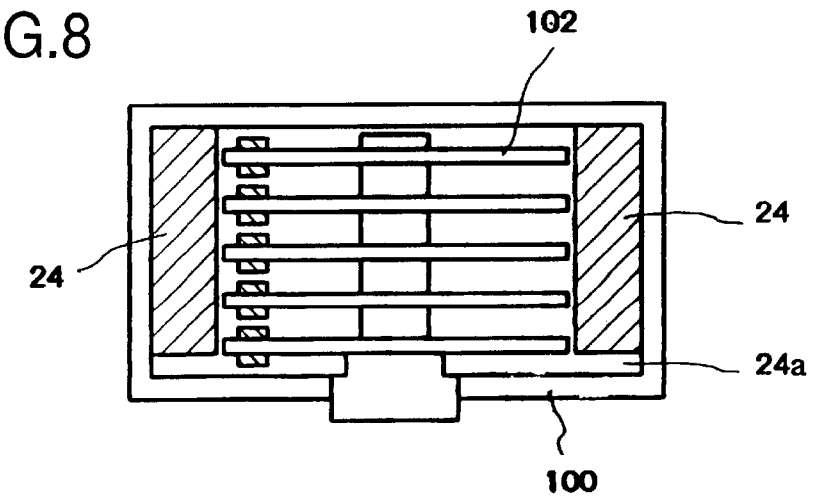
FIG. 8 is an explanation view of the disk drive unit in which a block-shaped screen member is provided.

In FIG. 8, the block-shaped screen member 124 is provided on the inner face of the enclosure 100. The clearance between the outer circumferential faces of the magnetic disks 102 and the screen member 24 is very narrow, e.g., about 1 mm. And a narrow space 24a, which is communicated to the clearance, is formed between a lower end face (i.e., the terminal end) of the screen member 24 and the inner bottom face of the enclosure 100.

Figure 14:
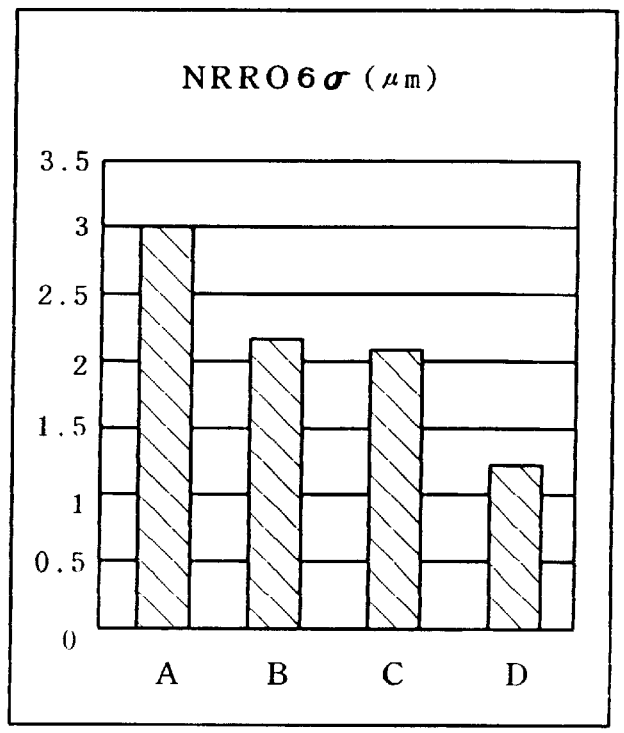
FIG. 14 is graphs showing vibration of the disk.

FIG. 14 shows graphs of vibrations (NRRO values) of the magnetic disks, in which: A is the conventional disk drive unit shown in FIG. 17, which has no screen member; B is the conventional disk drive unit shown in FIG. 18, which has the screen member 120; C is the disk drive unit of the embodiment shown in FIG. 8, which has the block-shaped screen member 24; and D is the disk drive unit of the embodiment shown in FIG. 7, which has the screen member 20. The NRRO 6 σ values of the graphs are as follows:

graph A: 2.986 μm;
graph B: 2.1233 μm;
graph C: 2.061 μm; and
graph D: 1.207 μm.

The result says that the screen member 20 shown in FIG. 7 is capable of effectively restricting the vibration of the magnetic disks.

Figure 18:
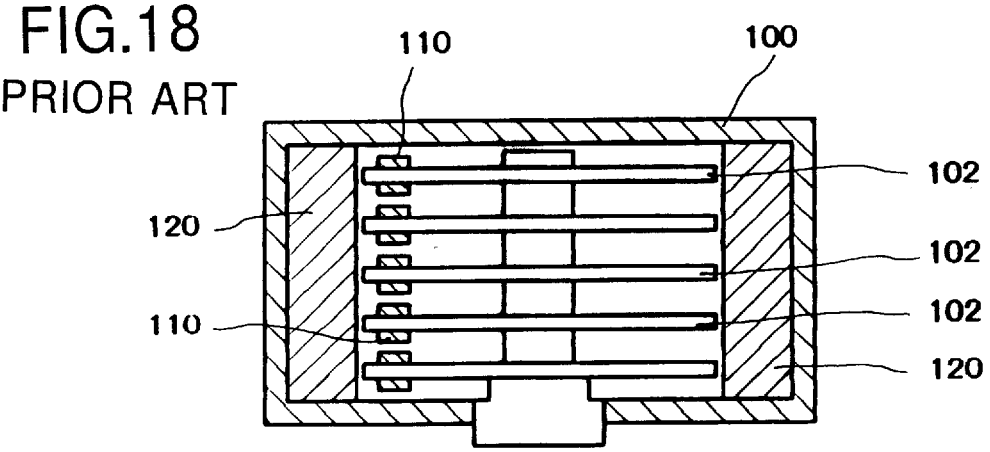
FIG. 18 is a side sectional view of another conventional disk drive in which arrangement of the disks are shown.

The experiments using the powders were executed in the disk drive units shown in FIGS. 7, 8 and 18, too. In the disk drive unit shown in FIG. 18, the powders stuck on the inner part of the upper face of the uppermost disk. In the disk drive unit shown in FIG. 8, small amount of the powders stuck on the upper face of the uppermost disk. And, in the disk drive unit shown in FIG. 7, almost no powders stuck on the upper face of the uppermost disk. The result says that the air streams flowing upward can be effectively restricted by the screen member 20 shown in FIG. 7. And, the screen members shown in FIGS. 8 and 18 are also capable of restricting the air streams flowing upward.

Other embodiment, which are capable of restricting the air streams, will be explained with reference to FIGS. 9–11.

Figure 9:
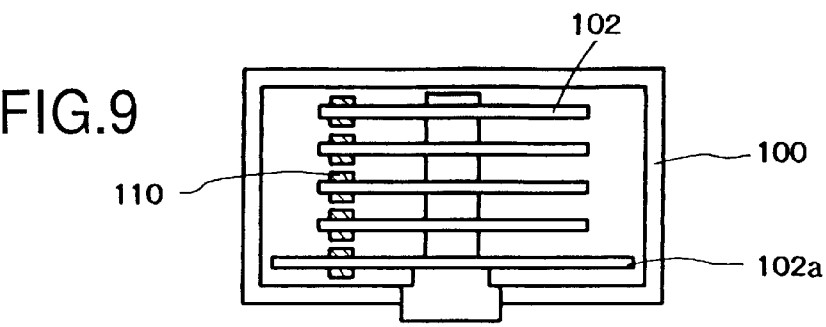
FIG. 9 is an explanation view of the disk drive unit in which a large disk is provided.
Figure 10:
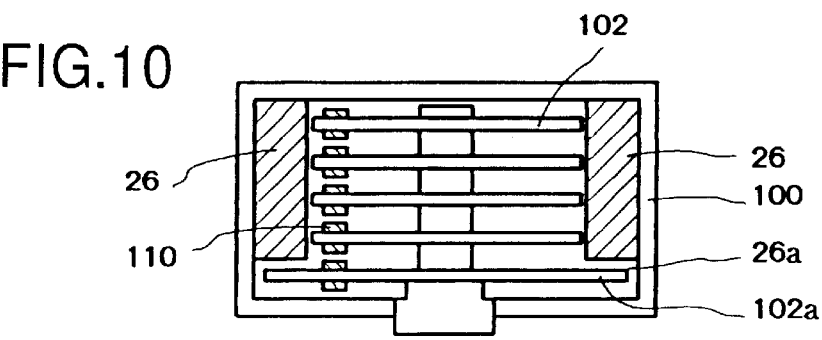
FIG. 10 is an explanation view of the disk drive unit in which the block-shaped screen member is provided.
Figure 11:
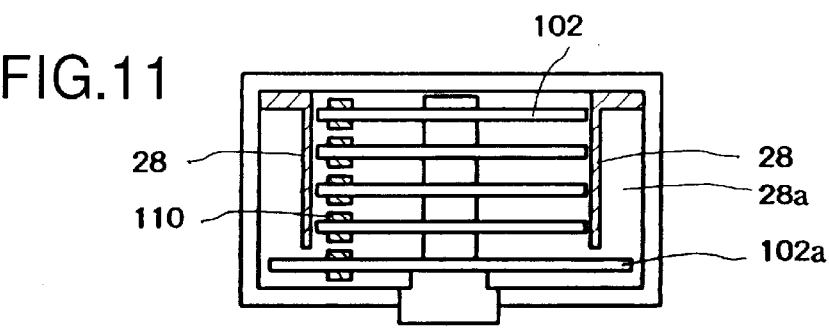
FIG. 11 is an explanation view of the disk drive unit in which the space is formed between the screen member and the inner face of the enclosure.

In each of FIGS. 9–11, diameter of the lowermost disk 102a, which is located immediately above the inner bottom face of the enclosure 100, is greater than that of other disks 102. An outer circumferential face of the large disk 102a is located close to the inner face of the enclosure 100. With this structure, the air streams, which upwardly flow from the inner bottom face of the enclosure 100, can be restricted.

In the embodiment shown in FIG. 9, the large disk 102a is employed but no screen member is provided. On the other hand, in the embodiments shown in FIGS. 10 and 11, the large disks 102a and screen members 26 and 28 are employed. In each embodiment, the clearance between the outer circumferential face of the large disk 102a and the inner face of the enclosure 100 is very narrow, e.g., about 1 mm. In FIG. 10, a block-shaped screen member 26 is employed; in FIG. 11, a space 28a is formed between a screen member 28 and the inner face of the enclosure 100. In each case, a space is formed between a lower end face of the screen member 26 or 28 and the inner bottom face of the enclosure 100 so as to pass an outer part of the large disk 102a. The space between the lower end face of the screen member 26 or 28 and the inner bottom face of the enclosure 100 acts as an air path. The clearance between outer circumferential faces of the magnetic disks 102 other than the large disk 102a and the inner face of the screen member 26 or 28 is very narrow as well as the foregoing embodiments.

Figure 15:
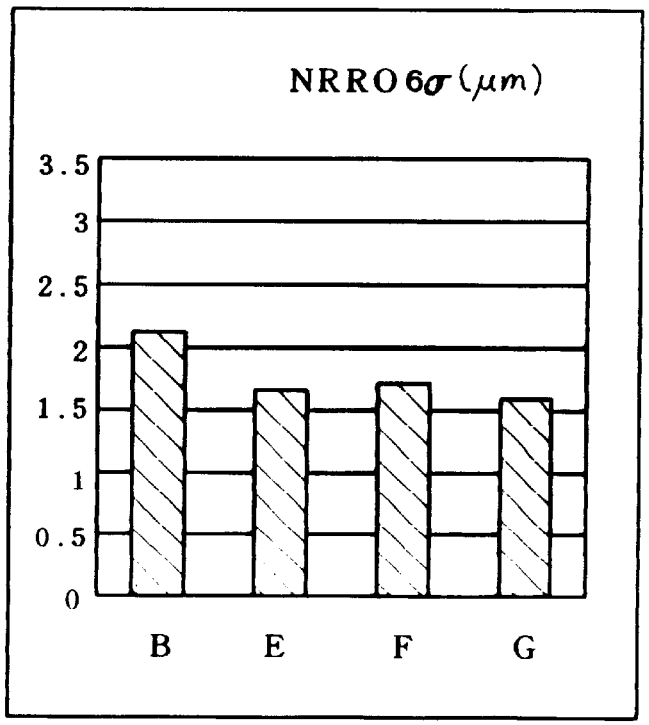
FIG. 15 is graphs showing vibration of the disk.
Figure 16:
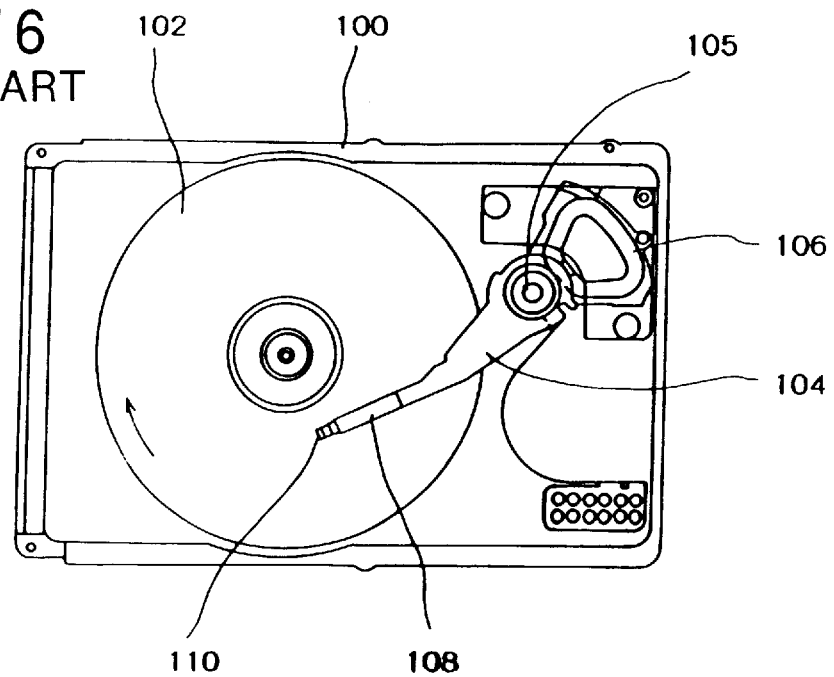
FIG. 16 is a plan view of the conventional disk drive unit.

FIG. 15 shows graphs of vibrations (NRRO values) of the magnetic disks, in which: B is the conventional disk drive unit; E is the disk drive unit of the embodiment shown in FIG. 9; F is the disk drive unit of the embodiment shown in FIG. 10; and G is the disk drive unit of the embodiment shown in FIG. 11. The NRRO 6σ values of the graphs are as follows:

graph B: 2.1233 µm;
graph E: 1.660 µm; and
graph F: 1.698 µm.
graph G: 1.581 µm.

The result says that the disk drive units shown in FIGS. 9–11 are capable of effectively restricting the vibration of the magnetic disks.

The experiments using the powders were executed in the disk drive units shown in FIGS. 9–11, too. In any cases, small amount of the powders stuck on the upper face of the uppermost disk. Especially, in the case shown in FIG. 11, almost no powders stuck on the upper face of the uppermost disk.

The result says that the air streams flowing upward can be effectively restricted by the large disk 102a.

Further, other embodiments will be explained with reference to FIGS. 12 and 13. In each case, diameter of the lowermost disk 102a, which is located immediately above the inner bottom face of the enclosure 100, and the uppermost disk 102b, which is located immediately below the cover, are greater than those of other disks 102. And, outer circumferential faces of the large disks 102a and 102b are located close to the inner face of the enclosure 100.

Figure 12:
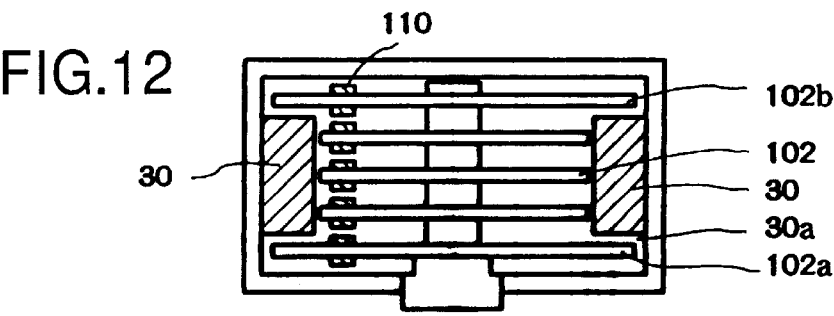
FIG. 12 is an explanation view of the disk drive unit in which a top disk and a bottom disk are large disks.
Figure 13:
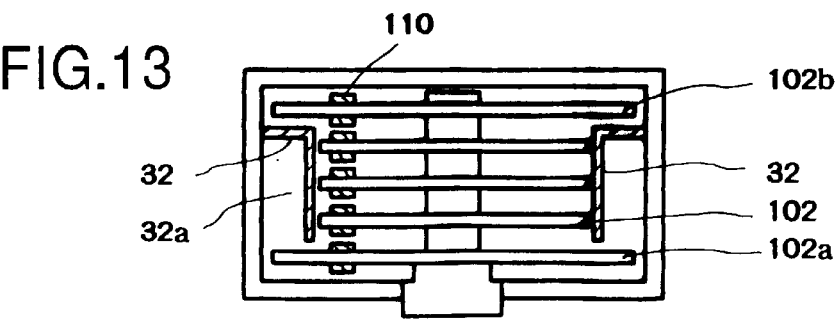
FIG. 13 is an explanation view of another disk drive unit in which a top disk and a bottom disk are large disks.

In FIG. 12, a block-shaped screen member 30 is provided between the large disks 102a and 102b; in FIG. 13, a screen member 32 is provided between the large disks 102a and 102b and a space 32a is formed between the screen member 32 and the inner face of the enclosure 100. A space 30a, which is formed between a lower end face of the screen member 30 and the inner bottom face of the enclosure 100, acts as an air path. As shown in FIG. 13, a lower end of the space 32a is opened.

In the embodiments shown in FIGS. 12 and 13, the screen members 30 and 32 may be omitted because the air streams, which upwardly flow from the inner bottom face of the enclosure 100, can be restricted by the large disks 102a and 102b.

TABLE 1

| Samples | A | B | C | D | E | F | G |
|---|---|---|---|---|---|---|---|
| Vibration of Disk | x | Δ | Δ | ⊚ | o | o | o |
| Crack of Disk | x | x | Δ | ⊚ | o | o | o |
| Deformation of Suspension | x | x | Δ | ⊚ | o | o | o |
| Crush | x | x | Δ | ⊚ | o | o | o |

Remarks: ⊚ excellent; o good; Δ fair; and x bad.

Figure 17:
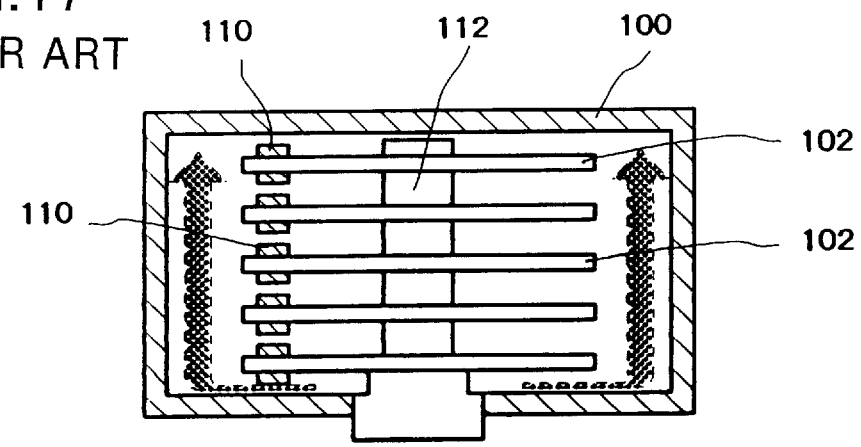
FIG. 17 is a side sectional view of the conventional disk drive in which arrangement of the disks are shown.

TABLE 1 shows results of product tests of the disk drive units shown in FIGS. 7–11 and the conventional disk drive units shown in FIGS. 17 and 18. The product tests were executed about "vibration of a disk", "crack of a disk", "deformation of a suspension" and "crush". The samples A–G correspond to the graphs A–G shown in FIGS. 14 and 15.

The results of Table 1 indicate that sample D, which is the disk drive unit shown in FIG. 7, has the best performance, while samples E, F and G are better than the remaining samples with sample C being effective.

In the above described embodiments, the screen members are respectively attached to the enclosures 100, but the present invention is not limited to the embodiments. The screen member may be integrated with the cover or the base of the enclosure 100. Namely, the screen member may be separated from and integrated with the enclosure.

Further, in the disk drive unit of the present invention, the magnetic disks 102 may be fixed to the shaft 112, and the magnetic disks 102 may be detachably attached to the shaft 112 so as to exchange the disks 102.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk drive unit comprising:

an enclosure;

a shaft being provided in said enclosure, said shaft rotatably holding a disk; and a screen member being provided on an inner face of said enclosure, said screen member enclosing said shaft and being extended in parallel to said shaft, wherein a space is annularly formed between a terminal end of said screen member and an inner bottom face of said enclosure, further wherein an upper end of said space corresponds to a lower face of the disk held by said shaft;

wherein said terminal end of said screen member corresponds to the distance from said inner bottom face of said enclosure to said lower face of the disk held by said shaft.

2. The disk drive unit according to claim 1, wherein another space is formed between said screen member and the inner face of said enclosure.

3. The disk drive unit according to claim 2, wherein said screen member is continuously rounded along the inner face of said enclosure.

4. The disk drive unit according to claim 1, wherein a plurality of the disks are held by said shaft, and an upper end of said space corresponds to a lower face of the lowermost disk held by said shaft.

5. The disk drive unit according to claim 2, wherein said screen member is generally L-shaped in cross-section.

6. The disk drive unit according to claim 2, wherein said screen member is generally U-shaped in cross-section.

* * * * *